United States Patent [19]
Soeder et al.

[11] Patent Number: 6,056,238
[45] Date of Patent: May 2, 2000

[54] SUPERSONIC GROUND VEHICLE

[75] Inventors: Walter S. Soeder, Patchogue; Joseph P. Laiosa, Smithtown, both of N.Y.

[73] Assignee: Northrop Grumman Corporation, Los Angeles, Calif.

[21] Appl. No.: 08/760,619

[22] Filed: Dec. 4, 1996

Related U.S. Application Data

[63] Continuation-in-part of application No. 08/296,509, Aug. 26, 1994, abandoned, and a continuation-in-part of application No. 08/296,501, Aug. 26, 1994, Pat. No. 5,583,493.

[51] Int. Cl.$^7$ ..................................................... B64C 1/00
[52] U.S. Cl. ............................ 244/34 A; 244/2; 244/36; 244/200; 244/117 R; 244/119; 244/130
[58] Field of Search ......................... 244/34 A, 2, 34 R, 244/35 R, 36, 200, 117 R, 119, 130

[56] References Cited

U.S. PATENT DOCUMENTS

| 934,771 | 9/1909 | Turnbull . | |
|---|---|---|---|
| 2,136,403 | 11/1938 | Vance et al. | 244/130 |
| 2,649,266 | 8/1953 | Darrieus | 244/130 |
| 3,249,327 | 5/1966 | Smith, Jr. | 244/123 |
| 4,735,381 | 4/1988 | Wood | 244/15 |
| 5,372,332 | 12/1994 | Spacht et al. | 244/2 |
| 5,395,072 | 3/1995 | Nelson | 244/36 |

FOREIGN PATENT DOCUMENTS

| 945470 | 5/1949 | France . |
|---|---|---|
| 1 294 822 | 5/1969 | Germany . |
| 626780 | 5/1948 | United Kingdom . |
| 896034 | 5/1962 | United Kingdom . |
| 2 029 714 | 5/1980 | United Kingdom . |

OTHER PUBLICATIONS

Ascher H. Shapiro, "The Dynamics and Thermodynamics of Compressible Fluid Flow", vol. I, pp. 579–580. date unknown.

H.W. Liepmann and A. Roshko, "Elements of Gasdynamics", pp. 115–118. date unkown.

A. Busemann, "Aerodynamischer Auftrieb Bei Uberschallgeschwindigkeit", Atti del Convengo della Fondazione Alessandro Volta 1935, pp. 328–360 (1936). month unknown.

NACA TN 3183 "Minimum Wave Drag Airfoil Sections for Arrow Wings" May 1954.

Eggers, Jr. Some Considerations of Aircraft Configurations Suitable for Long–Range Supersonic Vehicle.

NACA 1211 The Flow and Force Characteristics of Supersonic Airfoils at High Supersonic Speeds date unknown.

*Primary Examiner*—William A. Cuchlinski, Jr.
*Assistant Examiner*—Yonel Beaulieu
*Attorney, Agent, or Firm*—Terry J. Anderson; Karl J. Hoch, Jr.

[57] ABSTRACT

A supersonic ground vehicle having a housing configured from a pair of back-to-back symmetric housing components, and a shock-reflecting surface which extends in the direction of travel of the housing and which aerodynamically interacts with the housing to form a supersonic biplane, thereby substantially reducing aerodynamic pressure drag.

18 Claims, 5 Drawing Sheets

SUPERSONIC GROUND VEHICLE

This application is a continuation-in-part of application Ser. No. 08/296,509, filed Aug. 26, 1994, now abandoned; and a continuation-in-part of application Ser. No. 08/296,501, filed Aug. 26, 1994, now U.S. Pat. No. 5,583,493.

BACKGROUND OF THE INVENTION

1. Field of the Invention

The present invention generally relates to supersonic vehicles, and more particularly, to a supersonic ground vehicle having substantially reduced aerodynamic pressure drag.

2. Prior Art

When an object travels through the atmosphere at speeds greater than the speed of sound shock waves are formed. The generation of these shock waves requires a significant amount of power and results in considerable aerodynamic wave pressure drag on the object.

The classical approach to designing aircraft having reasonably low supersonic drag includes the incorporation of design attributes such as a pointed nose having a proper included angle, swept wings, and "area ruled" volume geometry. Such designs are utilized on all modern supersonic aircraft.

Currently, the only supersonic ground vehicles in use are rocket test sleds. These sleds are used to evaluate either aircraft crew ejection equipment or kinetic energy weapons. The aerodynamic design of existing rocket sleds do not utilize any special means for reducing drag at supersonic speeds apart from the classical approaches used in the design of supersonic aircraft. Existing rocket sleds overcome the large drag associated with their designs by using high powered rocket engines to propel them to supersonic speeds.

Existing rocket sleds have disadvantages associated with their high-powered rocket engines. For instance, rocket engines must utilize highly explosive materials to create the thrust needed to obtain supersonic speeds in a high drag environment. Using such highly explosive materials obviously creates dangerous explosive hazards. In addition, using highly explosive materials creates high operating costs due to the costs associated with the amount of material necessary to obtain the required thrust. In addition, flight at these speeds create noise levels not suitable for the human environment. In view of these disadvantages, supersonic ground transportation has been considered economically infeasible because the power required to propel such vehicles is prohibitive and because of noise control.

A method using favorable aerodynamic interference has been proposed to reduce or eliminate drag in supersonic aircraft. This method requires the implementation of a two-dimensional or axisymmetric "Supersonic Biplane" configuration which causes the shock waves generated by each wing to favorably interact with each other. Such configurations also have been suggested for use in the area of interference between wings and engine nacelles, where similar wave interactions could theoretically be effected with positive results. However, these low drag supersonic aircraft configurations have never been realized or used on aircraft due to their inherent structural complexity and because such vehicles must necessarily operate over a range of angles-of-attack and speeds which adds considerable complexity to the design of the favorably interfering elements.

The "Supersonic Biplane" concept was first developed by A. Busemann in the early 1900's, and thus, is known as the "Busemann Biplane" effect. Busemann's studies were centered around two-dimensional wedges and were presented in the absence of all frictional forces (viscosity). In the real world, the presence of frictional forces prevent the optimum condition of zero drag. However, because viscous effects are confined to very small regions close to solid surfaces, the presence of frictional forces do not prevent great reductions in and true minimizations of aerodynamic wave drag. The explanation that follows is based on the two-dimensional, frictionless theory of Busemann, however, Busemann's theory can be extended to explain why applicant's invention reduces aerodynamic drag in three-dimensional cross-sectional configurations in real world viscous environments.

During supersonic flight, a vehicle travels at speeds greater than the speed of sound. At such speeds, air is compressed just ahead of the vehicle. This compression region, or shock wave, is actually a high pressure sound wave that creates what is known as a "sonic boom". The creation of this disturbance is commonly called "breaking the sound barrier". Since this disturbance travels as a wave it is susceptible to the physical laws of wave cancellation and reinforcement. These physical laws are the basic mechanisms behind the "Busemann Biplane" effect.

To simplify the description of the "Busemann Biplane" effect let us suppose the air is moving at supersonic speed and the vehicle is stationary. In this condition, compare the air flow past a Busemann type two-dimensional upper/lower wedge configuration (see FIG. 1), and the air flow past a classically designed supersonic aircraft (see FIG. 2). The arrows in FIGS. 1 and 2 indicate the direction of the air flow which is traveling at a velocity (V) which is greater that the speed of sound ($V_{sound}$).

In the case of an aircraft in flight (FIG. 2), shock waves (sound waves) are created by the sudden change in direction of the incoming flow path caused by the nose of the aircraft. The wedges which form the nose are at an angle which causes the incoming flow to change direction, slow down and become compressed. The angle that the shock wave makes with the horizontal incoming flow is dependent upon the wedge angle and the velocity of the incoming flow. If the speed, wedge angle, or distance between the wedges is changed a variety of wave patterns are created.

To minimize the drag of the wedge geometry one needs to eliminate or minimize the exiting shock waves. The minimization of these waves implies that the outgoing air flow is returned back to the same flow condition that existed in the upstream undisturbed incoming flow field. One such flow pattern is shown in FIG. 1, where the wedge shaped configuration creates a shock wave which forms a symmetric "X" pattern in the forward and aft portions of the configuration.

In order to understand why this pattern is created the flow at the apex of the wedge must be examined. In FIG. 1, the incoming air flow intersects the wedges at the forward edges. The slope of the forward edges turn the flow and create shock waves. Since the angle of the forward edges with respect to the air flow is less than 90° the flow slows and the air is compressed. The generated shock waves then impinge at the apex of the wedges and are reflected away from the wedges. If the geometry is selected (as shown) such that the wedges are symmetric forward and aft, then the reflected waves will again intersect the wedges at the trailing edges. The intersection with the trailing edges causes the flow to be turned afterward. This time, however, the angle is greater than 90°, thus, the air expands and the flow speeds up, thereby eliminating the shock wave. This is exactly the opposite effect that occurs to the incoming flow.

If all conditions are met, the incoming and the outgoing flow are at the same condition and the air flow does not undergo any lasting change, hence, aerodynamic drag is effectively eliminated. However, in the real world this effect does not occur perfectly and these small changes in air characteristics cause minor increases in drag.

SUMMARY OF THE INVENTION

An object of the invention is to provide a supersonic ground vehicle having very low aerodynamic pressure drag.

Another object of the invention is to provide a supersonic ground vehicle which employs a "supersonic biplane" effect to provide favorable aerodynamic interference in a manner which provides very low aerodynamic pressure drag.

A further object of the invention is to provide a supersonic ground vehicle which need not be powered by rocket motors.

Still another object of the invention is to provide a supersonic ground vehicle of simple structure which functions efficiently, effectively and reliably at supersonic speeds.

Yet another object of the invention is to provide a supersonic ground vehicle which is free from explosive hazard.

Another object of the invention is to provide a supersonic ground vehicle which does not require high cost power and is, therefore, economically feasible.

Still another object of the invention is to provide a supersonic ground vehicle which utilizes an uncomplicated design of favorably interfering elements.

Yet another object of the invention is to provide a supersonic ground vehicle which can be propelled by a small, light power plant.

Still another object of the invention is to provide a supersonic ground vehicle devoid of acoustic noise normally associated with supersonic aircraft.

Yet another object of the invention is to provide a supersonic ground vehicle which may be used as a supersonic passenger and/or cargo transport train.

Another object of the invention is to provide a supersonic ground vehicle which may use a clean power source, such as, for example, solar energy.

Still another object of the invention is to provide a means of accelerating payloads to supersonic speeds as a reusable first stage for launching payload into space.

These and other objectives are achieved by a supersonic ground vehicle comprising a housing consisting of symmetric back-to-back housing components, and a shock-reflecting surface extending in the direction of travel of the housing and forming a supersonic biplane configuration with the housing thereby substantially reducing aerodynamic pressure drag.

In one embodiment of the supersonic ground vehicle of the present invention (see FIG. 3), the vehicle comprises housing having a pair of wedge-shaped housing components in back-to-back symmetric relation, and a shock-reflecting surface. Each housing component has substantially planar triangular sides, and substantially planar rectangular shaped tops and bottoms. These components are joined to form a symmetric wedge-shaped housing. The shock-reflecting surface comprises substantially planar top and bottom surfaces that extend in the direction of travel of the housing and are respectively located adjacent to the top and bottom portions of the housing.

Consider a side view of the supersonic ground vehicle described in FIG. 3 while in motion at a supersonic speeds (see FIG. 4). In FIG. 4, the incoming air flow intersects the forward wedge-shaped housing component at the forward edges. The slope of the forward edges of the wedge turn the flow and create shock waves, i.e. create high pressure sound waves. Since the angle of the forward edges with respect to the air flow is less than 90°, the flow slows and the air is compressed. The generated shock waves then intersects the shock-reflecting surface at points adjacent to the apices formed by the top and bottom surfaces of the forward and aft wedge-shaped housing components. The shock wave reflects off the shock-reflecting surface and intersects the aft wedge-shaped housing component at the trailing edges. The intersection of the reflected shock wave with the trailing edges causes the flow to be turned afterward. This time, however, the angle is greater than 90°, thus, the air expands and the flow speeds up, thereby eliminating the shock wave. This is exactly the opposite effect that occurs to the incoming flow.

Thus, the incoming and the outgoing flow are effectively at the same condition and the air flow does not undergo any lasting change, hence, aerodynamic drag is effectively eliminated.

The supersonic ground vehicle of the present invention enables a new generation of supersonic passenger and freight trains which would travel at supersonic speeds, propelled by considerably less power than presently known supersonic ground vehicles. The supersonic ground vehicle of the present invention would travel faster on land than aircraft, since aircraft are constrained to subsonic speeds by sonic boom noise levels. Furthermore, the supersonic ground vehicle of the invention could use a clean power source, such as, for example, solar energy, whereas aircraft are powered by fossil fuels, which contaminate the atmosphere.

Further benefits and advantages of the invention will become apparent from a consideration of the following detailed description which specifies alternate configurations and preferred embodiments of the invention.

DETAILED DESCRIPTION OF PREFERRED EMBODIMENTS

The supersonic ground vehicle of the present invention comprises a housing having back-to-back symmetric housing components, and a shock-reflecting surface which extends in the direction of travel of the housing. The shock-reflecting surface is configured to favorably interact with the shock-generating features of the housing so that, when the vehicle is traveling at supersonic speeds, generated shock waves are reflected from the shock-reflecting surface back onto the housing in a manner which eliminates the shock wave. As discussed above, this wave canceling theory is known as the "Supersonic" or "Busemann Biplane" effect.

The supersonic ground vehicle of the present invention may be supported by any suitable known means, including, for example, wheels or magnetic levitation. The vehicle may be propelled by any suitable known means, including wheels and magnetic fields, and powered by any suitable type of engine or engines, including, for example, combustion, magnetic or solar power engines. The propulsion device may be affixed to the vehicle or to a track along which the vehicle runs. The vehicle may ride upon the track or the track may be built integrally with the vehicle. In addition, if the shock-reflecting surface is closed, the air could be evacuated from the enclosure to further reduce the aerodynamic drag on the vehicle.

Any structure external to the vehicle and required to support said vehicle would be constructed in a manner which minimizes the aerodynamic interference between the structure and the vehicle. For example, pairs of mutually interfering struts, similar to supersonic biplanes, could be used if external struts are required to support the vehicle.

The supersonic ground vehicle of the present invention may comprise an entire vehicle or an element or elements of a vehicle and may be part of a supersonic train, supersonic sled, supersonic rail-launched vehicle or weapon.

Figure 1:
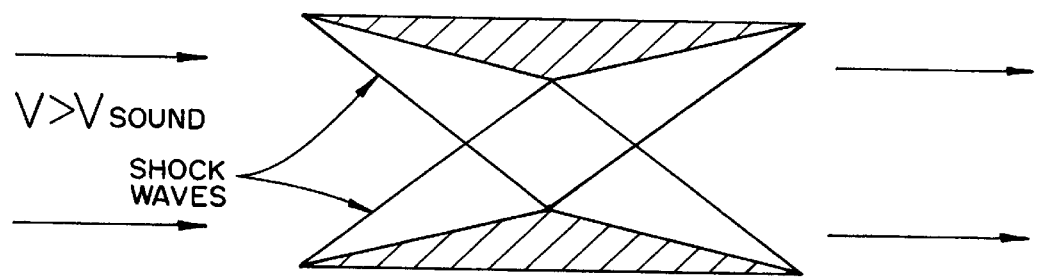
FIG. 1 illustrates the prior art "Supersonic" or "Busemann" Biplane effect on a pair of wedge-shaped elements.
Figure 2:
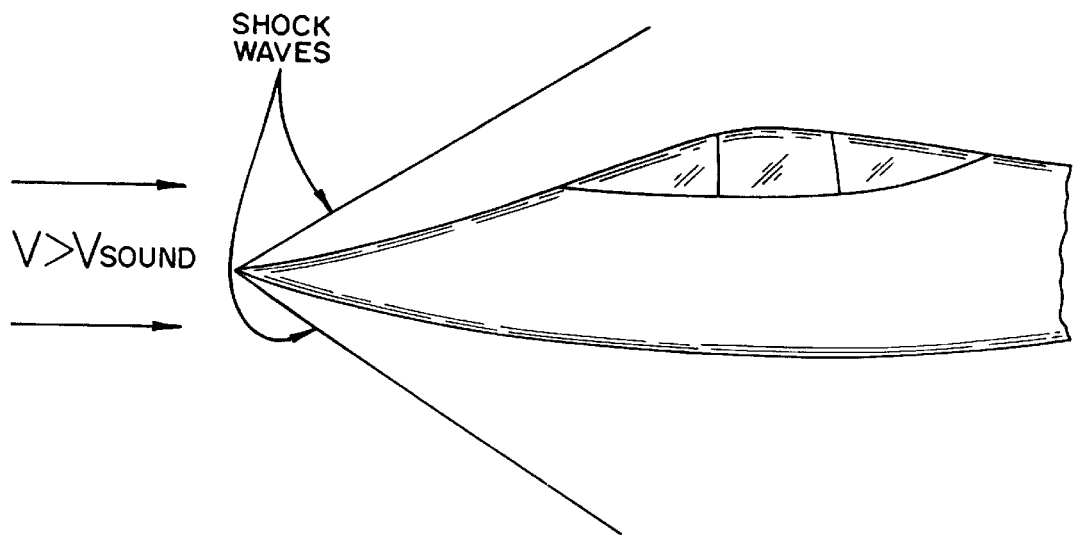
FIG. 2 illustrates the generation of a shock wave from a conventional prior art supersonic aircraft.
Figure 3:
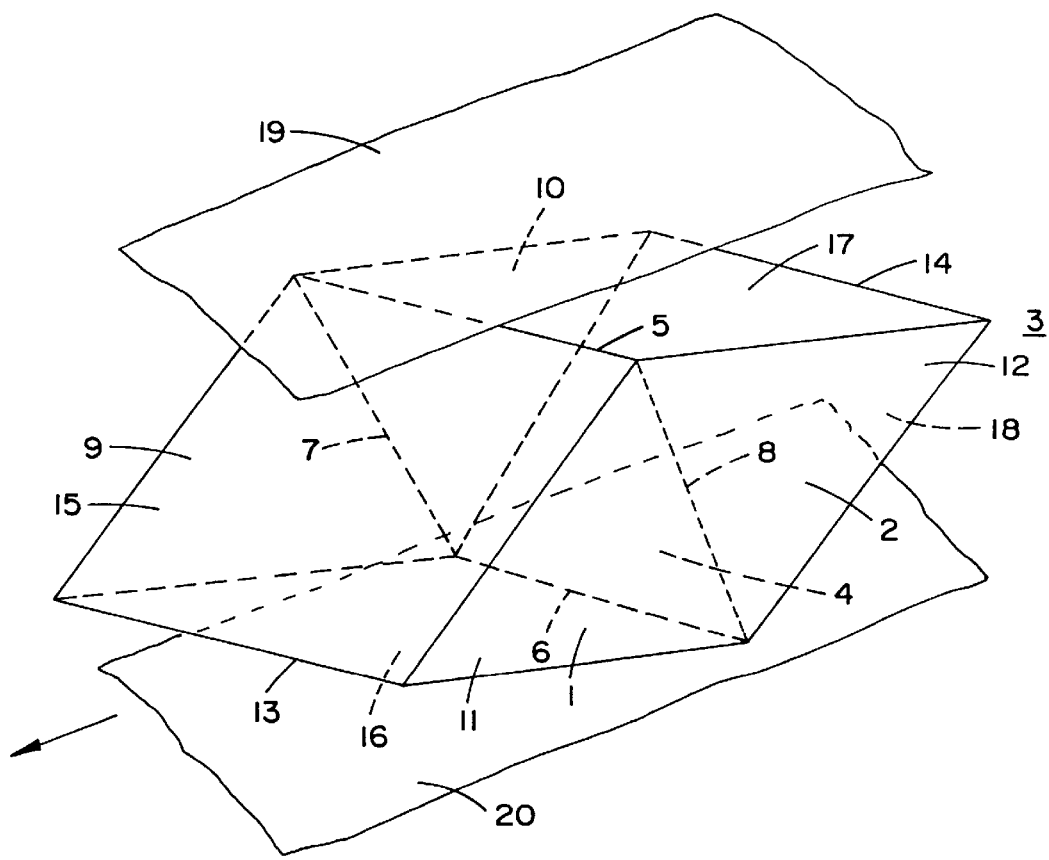
FIG. 3 illustrates, in perspective, a first embodiment of the supersonic ground vehicle of the present invention.

In a first embodiment of the supersonic ground vehicle of the present invention, as shown in FIG. 3, the vehicle comprises a pair of housing components 1 and 2 in back-to-back symmetric relation forming a housing 3. The housing components 1 and 2 are identical. Each housing component 1 and 2 has a substantially planar back 4 of substantially rectangular configuration. The back 4 may be a solid surface or an imaginary plane that the housing components 1 and 2 share in common, hence, the back 4 defines the section of the housing where housing components 1 and 2 are joined. The rectangular configuration of back 4 has vertically spaced substantially parallel top and bottom lines 5 and 6, respectively, and horizontally spaced substantially parallel side lines 7 and 8, respectively, joining said top and bottom lines, 5 and 6.

Each housing component 1 and 2 has substantially planar sides 9 and 10 and 11 and 12, respectively, of substantially triangular configuration extending from the side lines 7 and 8, respectively. Sides 9 and 11 have apices on a common line 13 horizontally spaced from the back 4 and vertically spaced between the top and bottom lines 5 and 6. Sides 10 and 12 have apices on a common line 14 horizontally spaced from the back 4 and vertically spaced between the top and bottom lines 5 and 6. Each of the sides 9, 10, 11 and 12 is an isosceles triangle.

Each housing component 1 and 2 has a substantially planar top and bottom 15 and 16 and 17 and 18, respectively, of substantially rectangular configuration. The top 15 and bottom 16 extend from the top and bottom lines 5 and 6, respectively, and are joined at the common line 13. The top 17 and bottom 18 extend from the top and bottom lines 5 and 6, respectively, and are joined at the common line 14.

The shock-reflecting surface of the first embodiment of the present invention comprises a substantially planar top surface 19 substantially parallel to a plane formed through the common lines 13 and 14 of the housing components 1 and 2 and located vertically adjacent to the top line 5, and a substantially planar bottom surface 20 substantially parallel to said top surface and vertically adjacent the bottom line 6.

Figure 5:
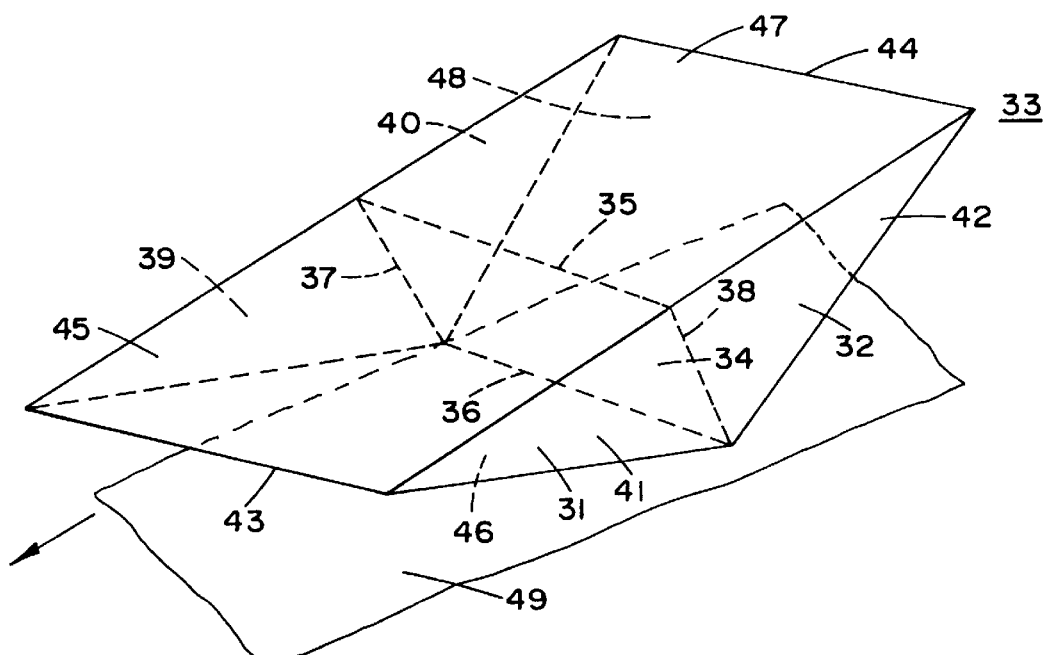
FIG. 5 illustrates, in perspective, a second embodiment of the supersonic ground vehicle of the present invention.
Figure 4:
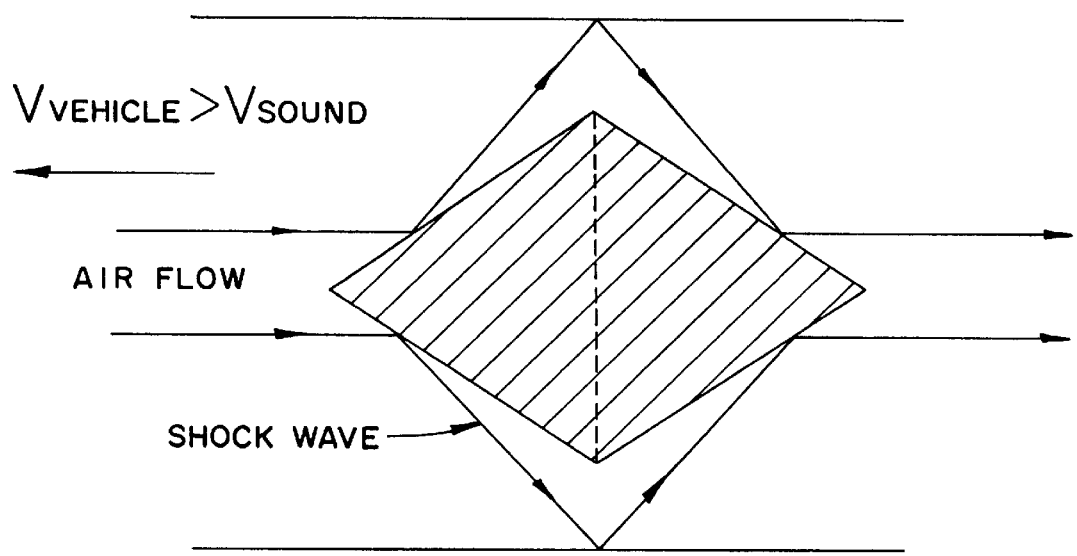
FIG. 4 illustrates the "Supersonic Biplane" effect on the supersonic ground vehicle illustrated in FIG. 3 while traveling at super sonic speeds.

In a second embodiment of the supersonic ground vehicle of the present invention, as shown in FIG. 5, the vehicle comprises a pair of housing components 31 and 32 in back-to-back symmetric relation forming a housing 33. The housing components 31 and 32 are identical. Each housing component 31 and 32 has a substantially planar back 4 of substantially rectangular configuration. The back 34 may be a solid surface or an imaginary plane that the housing components 31 and 32 share in common, hence, the back 34 defines the section of the housing where housing components 31 and 32 are joined. The rectangular configuration of back 34 has vertically spaced substantially parallel top and bottom lines 35 and 36, respectively, and horizontally spaced substantially parallel side lines 37 and 38, respectively, joining said top and bottom lines.

Each housing component 31 and 32 has substantially planar sides 39 and 40 and 41 and 42, respectively, of substantially triangular configuration extending from the side lines 37 and 38, respectively. The sides 39 and 41 have apices on a common line 43 which is horizontally spaced from the back 34, vertically spaced from the bottom line 36, and located within a horizontal plane which is perpendicular to the back 34 and is formed through the top line 35. The sides 40 and 42 have apices on a common line 44 which is horizontally spaced from the back 34, vertically spaced from the bottom line 36, and located within a horizontal plane which is perpendicular to the back 34 and is formed through the top line 35. Each of the sides 39, 40, 41 and 42 is an acute triangle.

Each housing component 31 and 32 has a substantially planar top and bottom 45 and 46 and 47 and 48, respectively, of substantially rectangular configuration. The top 45 extends from the top line 35 to the common line 43, and the bottom 46 extends from the bottom line 36 and joins with the top 45 at the common line 43. The top 47 extends from the top line 35 to the common line 44, and the bottom 48 extends from the bottom line 36 and joins with the top 47 at the common line 44. Tops 45 and 47 form a flat surface across the entire housing formed through common lines 43 and 44 and top line 35.

The shock-reflecting surface of the second embodiment of the present invention comprises a substantially planar bottom surface 49 which is substantially parallel to tops 45 and 47 and vertically adjacent to the bottom line 36.

Figure 6:
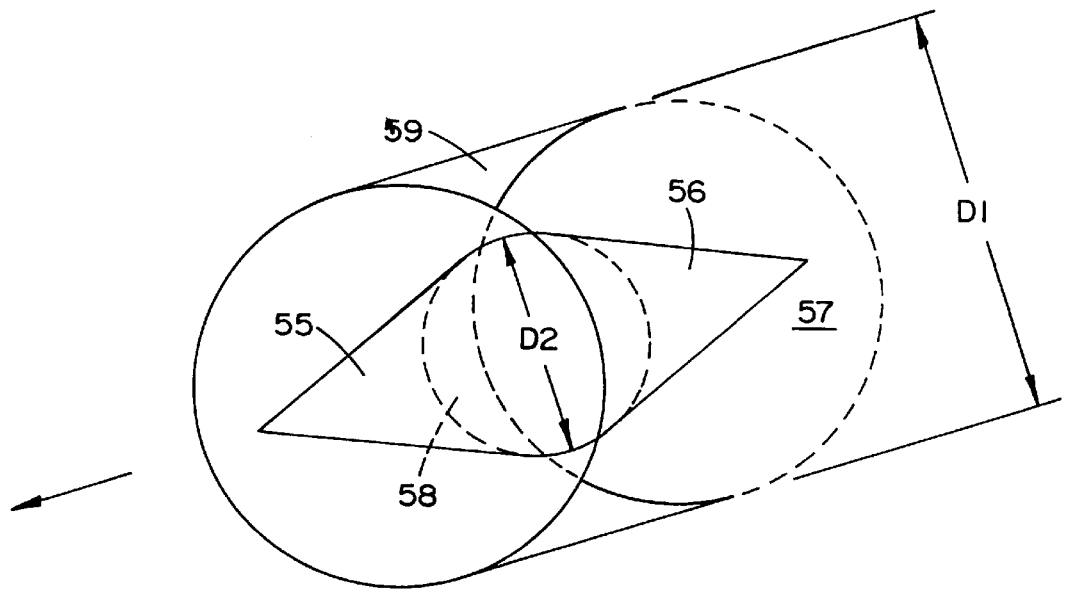
FIG. 6 illustrates, in perspective, a third embodiment of the supersonic ground vehicle of the present invention.

The third embodiment of the supersonic ground vehicle of the present invention, as shown in FIG. 6, comprises a pair of housing components 55 and 56 in back-to-back symmetric relation forming a housing 57. The housing components 55 and 56 are identical. Each housing component 55 and 56 has a substantially planar back 58 of substantially circular configuration having a diameter D2. The back 58 may be a solid surface or an imaginary plane that the housing components 55 and 56 share in common, hence, the back 58 defines the section of the housing where housing components 55 and 56 are joined.

Each housing component 55 and 56 consists of a cone-shaped surface horizontally extending from the back 58. Each of the cone-shaped housing components 55 and 56 is a right circular cone.

The shock-reflecting surface of the third embodiment of the present invention comprises a substantially cylindrical surface 59 coaxial with and around the housing 57. The shock-reflecting surface 59 has a diameter D1 greater than the diameter D2, which is effectively the diameter of the housing 57.

Figure 7:
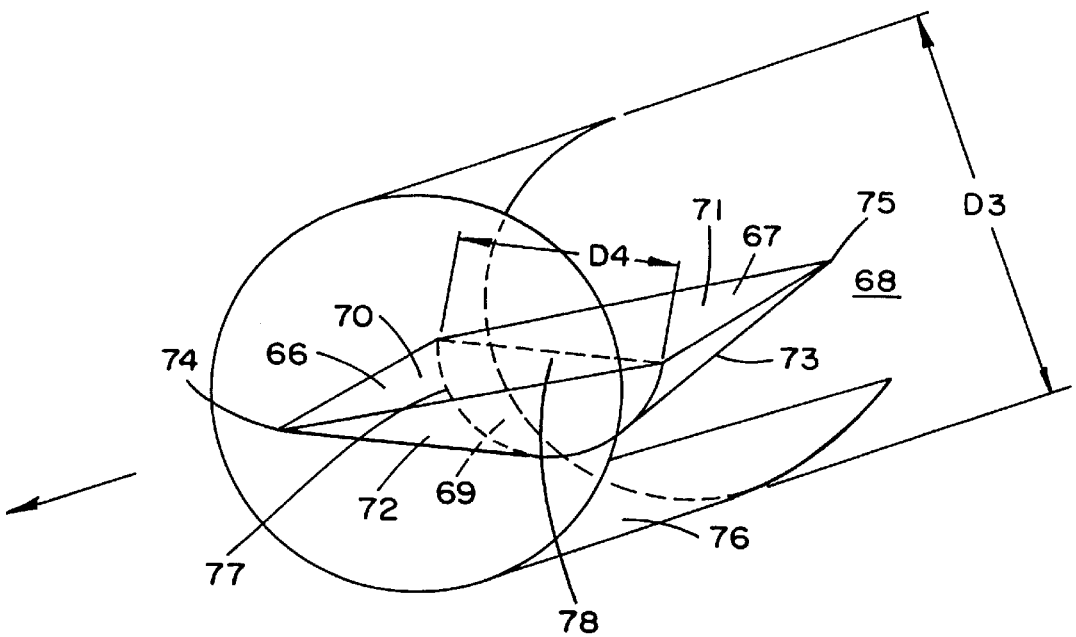
FIG. 7 illustrates, in perspective, a fourth embodiment of the supersonic ground vehicle of the present invention.

The fourth embodiment of the supersonic ground vehicle of the present invention, as shown in FIG. 7, comprises a pair of housing components 66 and 67 in back-to-back symmetric relation forming a housing 68. The housing components 66 and 67 are identical. Each housing component 66 and 67 has a substantially planar back 69 of substantially semi-circular configuration having a diameter D4. The back 69 may be a solid surface or an imaginary plane that the housing components 66 and 67 share in common, hence, the back 69 defines the section of the housing where the housing components 66 and 67 are joined.

Each housing component 66 and 67 consists of a semi-conical bottom surface 72 and 73 horizontally extending from a semi-circular bottom arc 77 formed by the back 69. Each of the semi-conical housing components 66 and 67 is a right semi-circular cone.

Each housing component 66 and 67 has a substantially planar top 70 and 71, respectively, of triangular configuration which extends horizontally outward from the a line 78 formed by the back 69. The apices of the triangular tops 70 and 71 join the vertices of the semi-conical bottoms 72 and 73 at vertices 74 and 75, respectively. Hence, tops 70 and 71, which are joined at top line 78, form a flat planar surface across the top of the housing 68 extending from vertex 74 to vertex 75.

The shock-reflecting surface of the fourth embodiment of the present invention comprises a substantially semi-cylindrical surface 76 coaxial with and around the semi-conical bottom surfaces 72 and 73 of the housing components 66 and 67. The shock-reflecting surface 76 has a diameter D3 greater than the diameter D4, which is effectively the diameter of the housing 68.

Figure 8:
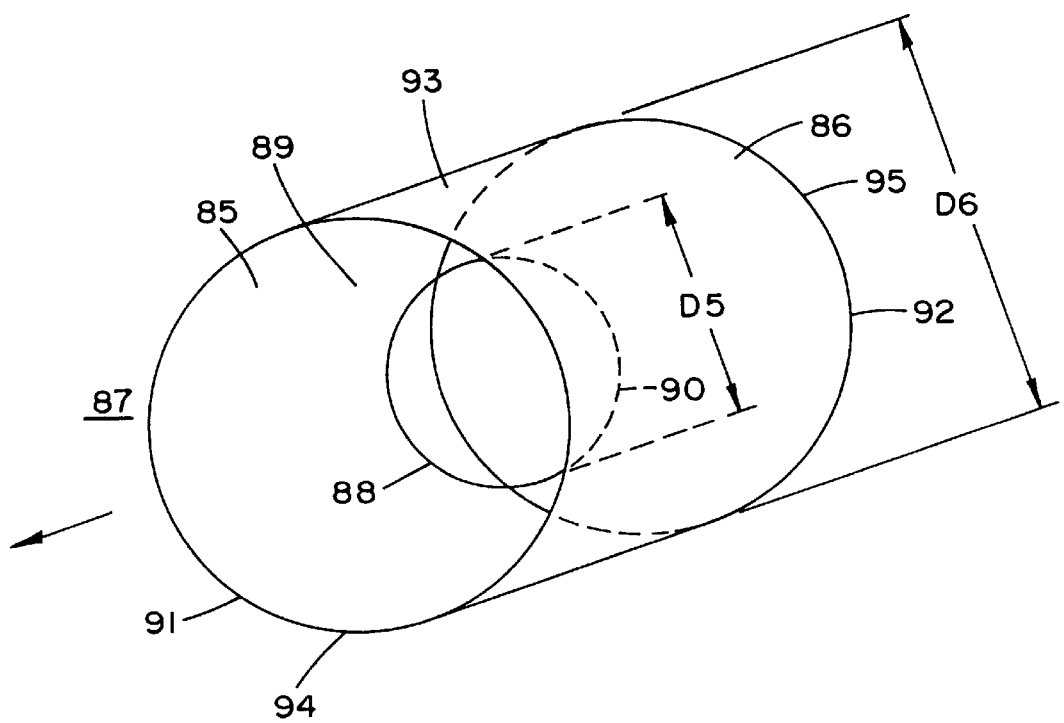
FIG. 8 illustrates, in perspective, a fifth embodiment of the supersonic ground vehicle of the present invention.

The fifth embodiment of the supersonic ground vehicle of the present invention, as shown in FIG. 8, is a symmetric, ring-shaped vehicle without an external shock-reflecting surface. The shocks are internal to the ring, so that shocks generated by one sector of the forward edge of the vehicle impinge upon the other sector of the rear edge of said vehicle in a favorable manner.

As illustrated in FIG. 8, the fifth embodiment of the invention comprises a pair of housing components 85 and 86 in back-to-back symmetric relation forming a housing 87. The housing components 85 and 86 are identical. Each housing component 85 and 86 has a concentric ring-shaped back 88. The back 88 may consist of some solid surfaces or may be an imaginary plane that housing components 85 and 86 share in common, hence, the back 88 defines the section of the housing 87 where the housing components 85 and 86 are joined. Each housing component 85 and 86 consists of a frustcone extending from the ring-shaped back 88 and having a first base, 89 and 90, of a first diameter D5, superimposed upon said back 88, and a second base 91 and 92, respectively, of a second diameter D6, spaced from said first base.

The surface of the housing 87 comprises a substantially cylindrical outer surface 93 coaxial with and around the housing components 85 and 86. The outer surface 93 has the diameter D6, equal to said second diameter, and bases 94 and 95 superimposed upon the second bases 91 and 92 of the housing components 85 and 86, respectively.

In the third and fourth embodiments of the present invention, the diameter of the shock-reflecting surface may be varied along the length of the surface to optimize the drag of the vehicle during acceleration to its design speed. Such a variation of diameter could also be used to prevent the formation of normal shocks ahead of the vehicle during its transition to its design speed. The surface also may be perforated to prevent the formation of normal shocks ahead of the vehicle during acceleration to its design speed.

While a plurality of embodiments of the present invention have been shown and described, it is to be understood that many changes and modifications may be made thereunto without departing from the spirit and scope of the invention as defined in the appended claims.

What is claimed is:

1. A supersonic ground vehicle having substantially reduced aerodynamic drag comprising:

a symmetric housing having first and second symmetric housing components, said first and second symmetric housing components being placed back-to-back about a common plane to form the symmetric housing; and a shock-reflecting surface extending in a direction of travel of said symmetric housing and interacting therewith, and forming a supersonic biplane with said symmetric housing to substantially reduce aerodynamic pressure drag.

2. The supersonic ground vehicle according to claim 1, wherein each of said first and second symmetric housing components is wedge-shaped.

3. The supersonic ground vehicle according to claim 2, wherein said common plane is of substantially rectangular configuration having vertically spaced substantially parallel top and bottom lines and horizontally spaced substantially parallel side lines joining said top and bottom lines;

each of said first and second symmetric housing components having substantially planar sides of substantially triangular configuration extending from said parallel side lines and having apices on a common line horizontally spaced from said back and vertically spaced between said top and bottom lines, and a substantially planar top and bottom of substantially rectangular configuration extending from said top and bottom lines, respectively, and joined at said common line.

4. The supersonic ground vehicle according to claim 3, wherein said shock-reflecting surface comprises a substantially planar top surface substantially parallel to a plane formed through said common lines of said first and second symmetric housing components and vertically adjacent to said top line, and a substantially planar bottom surface substantially parallel to said top surface and vertically adjacent to said bottom line.

5. The supersonic ground vehicle according to claim 3, wherein each of said substantially planar sides is in the shape of an isosceles triangle.

6. The supersonic ground vehicle according to claim 2, wherein said housing components are joined at a substantially planar back of substantially rectangular configuration having vertically spaced substantially parallel top and bottom lines and horizontally spaced substantially parallel side lines joining said top and bottom lines;

each of said housing components having substantially planar sides of substantially triangular configuration extending from said side lines and having apices on a common line horizontally spaced from said back and within a horizontal plane perpendicular to said back and formed through said top line, and a substantially planar top of substantially rectangular configuration extending from said top line to said common line.

7. The supersonic ground vehicle according to claim 6, wherein said shock-reflecting surface comprises a substantially planar bottom surface substantially parallel to said top and located vertically adjacent to said bottom line.

8. The supersonic ground vehicle according to claim 7, wherein each of said sides forms an acute triangle.

9. The supersonic ground vehicle according to claim 1, wherein each of said housing components is cone-shaped.

10. The supersonic ground vehicle according to claim 9, wherein said housing components are joined at a substantially planar back of substantially circular configuration having a diameter D2; and each of said housing components has a cone-shaped surface horizontally extending from said back.

11. The supersonic ground vehicle according to claim 10, wherein said shock-reflecting surface comprises a substantially cylindrical surface coaxial with and around said housing, said cylindrical surface having a diameter D1 greater than the diameter D2.

12. The supersonic ground vehicle according to claim 11, wherein each of said cone-shaped housing components is a right circular cone.

13. The supersonic ground vehicle according to claim 1, wherein each of said housing components has a semi-conical shape.

14. The supersonic ground vehicle according to claim 13, wherein said housing components are joined at a substantially planar back of substantially semi-circular configuration having a diameter D4, said semi-circular configuration having a semi-circular bottom arc and a top line; and each of said housing components has a semi-conical bottom surface horizontally extending from said semi-circular arc, and a substantially planar top of substantially triangular configuration horizontally extending from said top line an terminating at a common vertex formed with said semi-conical bottom surface.

15. The supersonic ground vehicle according to claim 14, wherein said shock-reflecting surface comprises a substantially semi-cylindrical surface coaxial with and around said semi-conical bottom surfaces, said semi-cylindrical surface having a diameter D3 greater than the diameter D4.

16. The supersonic ground vehicle according to claim 15, wherein each of said semi-conical housing components a right semi-circular cone.

17. The supersonic ground vehicle according to claim 1, wherein each of said housing components has a ring-shaped back and consists of a frustocone extending from the back and having a first base of a first diameter superimposed upon the ring-shaped back, a second base of a second diameter greater than the first diameter spaced from the first base, and a substantially cylindrical outer surface coaxial with and around said housing components.

18. The supersonic ground vehicle according to claim 1, wherein acoustic noise is substantially reduced.

* * * * *